Nov. 28, 1961 P. ORR ET AL 3,010,343
TRANSMISSION
Filed Aug. 1, 1960
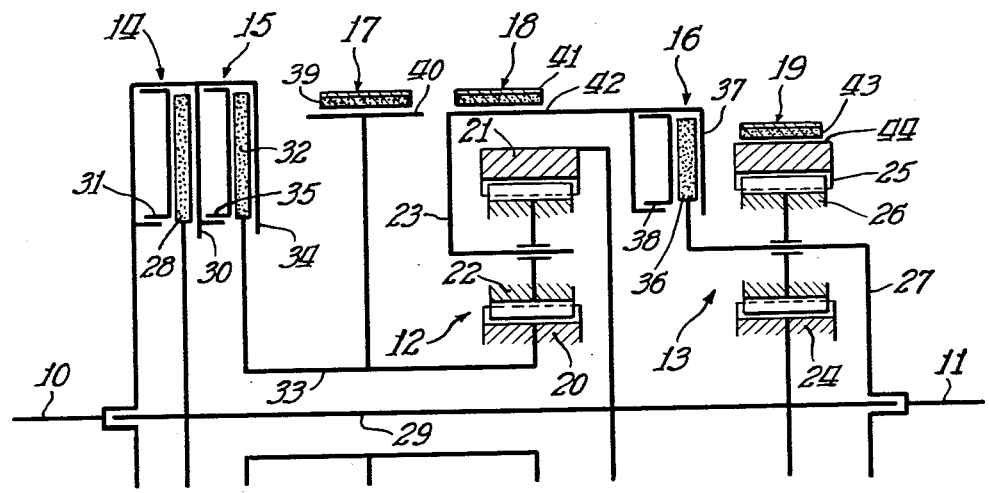
Inventors:
Palmer Orr and
Donald W. Kelbel
By: Ray E. Snyder Atty.

United States Patent Office 3,010,343
Patented Nov. 28, 1961

3,010,343
TRANSMISSION
Palmer Orr and Donald W. Kelbel, Muncie, Ind., assignors to Borg-Warner Corporation, Chicago, Ill., a corporation of Illinois
Filed Aug. 1, 1960, Ser. No. 46,797
3 Claims. (Cl. 74—753)

This invention relates to transmissions particularly adapted for use in automotive vehicles and more particularly for use in trucks.

It is an object of the present invention to provide an automotive transmission comprising two simple planetary gear sets interconnected by various engaging devices which will give three forward speed drives and two drives in reverse.

It is also an object of the invention to provide a transmission of this type having a wide range of speed ratios which are generally equally spaced with respect to each other in order to give a wide flexibility of operation to the vehicle. It is contemplated that all the engaging devices shall preferably be of the friction type in order to insure a smoothness of ratio changing.

It is another object of the invention to provide a transmission so arranged as to require a minimum number of these friction devices for completing the various drive ratios. More particularly, it is contemplated that the transmission may be controlled by three friction clutches and three friction brakes to provide the three forward speed drives and the two reverse drives. It is an object to so arrange the transmission that a maximum of three friction engaging devices are engaged at any one time to complete any one of the various speed ratios.

It is a further object of the invention to provide an improved transmission having two reverse speed drives which are numerically considerably lower than the low speed forward drive.

The present invention consists of the novel constructions, arrangements and devices to be hereinafter described and claimed for carrying out the above stated objects and such other objects as will appear from the following description of a preferred form of the invention, illustrated with reference to the accompanying drawing which is a diagrammatic illustration of a transmission.

The illustrated transmission comprises a drive shaft 10 and a driven shaft 11. The drive shaft 10 is adapted to be driven by the engine (not shown) of the vehicle in which the transmission is installed, and the drive shaft 11 is adapted to drive the rear driving road wheels (not shown) of the vehicle through any suitable drive connections (not shown).

The transmission comprises, in general, a planetary gear set 12, a second planetary gear set 13, three friction clutches, 14, 15 and 16, and three friction brakes, 17, 18 and 19.

The planetary gear set 12 comprises a sun gear 20, a ring gear 21, a plurality of planet gears 22 in mesh with the sun gear 20 and the ring gear 21, and a planet gear carrier 23 for the planet gears 22. The planetary gear set 13 comprises a sun gear 24, a ring gear 25, a plurality of planet gears 26 in mesh with the sun gear 24 and the ring gear 25, and a planet gear carrier 27 for the planet gears 26. The gear carrier 27 is connected to the driven shaft 11.

The friction clutch 14 comprises a clutch disc 28 connected to the ring gear 21 of the gear set 12 and the sun gear 24 of the gear set 13 through intermediate shaft 29. The clutch 14 includes a pressure plate 30 connected to the drive shaft 10 and further includes a fluid pressure actuated piston 31 which grips the clutch disc 28 between the pressure plate 30 and the piston 31.

The friction clutch 15 comprises a clutch disc 32 connected to the sun gear 20 by means of a quill shaft 33. The clutch 15 includes a pressure plate 34 connected to the drive shaft 10 and a fluid pressure actuated piston 35 which grips the clutch disc 32 between the pressure plate 34 and the piston 35.

The friction clutch 16 comprises a clutch disc 36, a pressure plate 37 connected to the gear carrier 23 and a fluid pressure actuated piston 38 which grips the clutch disc 36 between the pressure plate 37 and the piston 38. The clutch disc 36 is connected to the planet gear carrier 27 and the driven shaft 11.

The brake 17 comprises a brake band 39 engageable on a brake drum 40. The brake drum 40 is connected to the quill shaft 33, the clutch disc 32 and the sun gear 20.

The brake 18 comprises a brake band 41 engageable on a brake drum 42. The brake drum 42 forms a portion of the connection between the planet gear carrier 23 and the pressure plate 37 of the clutch 16.

The brake 19 comprises a brake band 43 engageable on a brake drum 44 carried by the ring gear 25 of the gear set 13. The brake bands 39, 41 and 43 may be engaged with their respective drums 40, 42 and 44 by any suitable means such as fluid pressure actuated servo motors of any well-known type (not shown).

The transmission provides a first or low-speed forward drive ratio, a second or intermediate speed, and a third or direct drive and two reverse drive ratios.

A neutral condition is provided in the transmission when the clutches 14, 15 and 16 and the brakes 17, 18 and 19 are all disengaged, and the shaft 11 will not be driven by the shaft 10.

The low speed forward drive, referred to as first speed, is completed by engaging the friction clutch 14 and the brake 19. Power flows from the driving shaft 10 through the clutch 14 and the intermediate shaft 29 to the sun gear 24. The brake 19 holds the ring gear 25 against rotation so that the ring gear 25 functions as the reaction element for the gear set 13. Thus the sun gear 24 drives the planet gears 26 causing them to planetate within the ring gear 25 and causing the planet gear carrier 27 and the driven shaft 11 connected to the gear carrier 27 to be driven at a reduced speed with respect to the shaft 29 and the drive shaft 10.

Intermediate speed forward drive, referred to as second speed, is completed by disengaging the brake 19, engaging the clutch 16 and the brake 17 and allowing the clutch 14 to remain engaged. Power flows from the drive shaft 10 through the clutch 14 and the intermediate shaft 29 to the ring gear 21 of the gear set 12 and to the sun gear 24 of the gear set 13. The brake 17 holds the sun gear 20 against rotation so that the sun gear 20 functions as a reaction element for the gear set 12. Power flows from the ring gear 21 to the planet gears 22 causing the planet gears 22 to planetate about the sun gear 20 and drive the gear carrier 23 at a reduced speed with respect to the ring gear 21, the shaft 29 and the drive shaft 10. By engaging the clutch 16, the carrier 27 is connected with the carrier 23. Power also flows from the sun gear 24 to the planet gears 26 to drive the carrier 27. The net effect of the two paths of power flow into the carrier 27 is to drive the carrier 27 and the driven shaft 11 connected thereto at less of a speed reduction with respect to the drive shaft 10 than if there were no power flow from the sun gear 24 to the planet gears 26.

Direct drive through the transmission is completed by disengaging the brake 17, engaging the clutch 15 and allowing the clutches 14 and 16 to remain engaged. Power is transmitted from the drive shaft 10 through the clutch 14 and the shaft 29 to the ring gear 21. Power is also transmitted from the drive shaft 10 through the clutch 15, the quill shaft 33 to the sun gear 20. Since two elements of the planetary gear set 12 are driven at the same speed, the elements are locked together and the gear set 12 is driven as a unit. Furthermore, since the sun gear 24 is permanently connected to the ring gear 21, and the carrier 27 is connected to the carrier 23 by engagement of clutch 16, two elements of the gear set 13 are also locked together. This locks the gear set 13 to the gear set 12 to effect a direct drive between the drive shaft 10 and the driven shaft 11.

The first reverse speed drive through the transmission is completed by engaging the clutch 15, the brake 18 and the brake 19. The brake 18 holds the carrier 23 so that the carrier 23 functions as a reaction element for the gear set 12. Power flows from the drive shaft 10 through the clutch 15 and the quill shaft 33 to the sun gear 20. With the carrier 23 held against rotation power flows from the sun gear 20 through the planet gears 22 to the ring gear 21 thereby causing the ring gear 21 to be driven at a reduced speed with respect to shaft 33 and the drive shaft 10 and in a reverse direction therefrom. Power then flows from the ring gear 21 through the shaft 29 to the sun gear 24. The brake 19 holds the ring gear 25 against rotation so that the ring gear 25 functions as a reaction element for the gear set 13. Power then flows from the sun gear 24 to the planet gears 26 causing the carrier 27 and the driven shaft 11 connected thereto to be driven at a greatly reduced speed with respect to the sun gear 24 and in the same direction as the sun gear 24 which is, of course, in a reverse direction from the drive shaft 10. It will be noted that we have here a tandem relationship between the reduced speed produced in gear set 12 and the reduced speed produced in gear set 13.

The second reverse drive through the transmission is completed by disengaging the brake 18, engaging the clutch 16 and allowing the clutch 15 and the brake 19 to remain engaged. Power flows from the drive shaft 10 through the clutch 15 and the shaft 33 to the sun gear 20. The brake 19 holds the ring gear 25 against rotation so that the ring gear 25 functions as a reaction element for the gearing system. Power flows from the sun gear 20 to the planet gears 22 to drive the gear carriers 23 and 27 connected together by engagement of the clutch 16.

For the purposes of illustration only, a table is set forth below illustrating the speed ratios obtainable by the transmission with one particular size for each of the gears in the gear sets 12 and 13. The table also sets forth in tabular form the various brakes and clutches that are engaged to complete the various drives through the transmission.

| Speeds | C14 | C15 | C16 | B17 | B18 | B19 | Ratios |
| --- | --- | --- | --- | --- | --- | --- | --- |
| 1st | On | | | | | On | 3.00 to 1.00. |
| 2nd | On | | On | On | | | 1.381 to 1.00. |
| 3rd | On | On | On | | | | 1.00 to 1.00. |
| L-Rev | | On | | | On | On | 7.857 to 1.00. |
| H-Rev | | On | On | | | On | 4.238 to 1.00. |

The particular numerical ratios for the various drives through this transmission, as indicated above, are obtained when the gears have the following number of teeth:

|  | Teeth |
| --- | --- |
| Sun gear 20 | 21 |
| Ring gear 21 | 55 |
| Sun gear 24 | 24 |
| Ring gear 25 | 48 |

It will be understood that gears with other numbers of teeth may be used if desired to obtain other numerically different speed ratios, all within the scope of the present invention.

It is to be understood that the invention is not to be limited to the specific constructions and arrangements shown and described, except only insofar as the claims may be so limited, as it will be understood to those skilled in the art that changes may be made without departing from the principles of the invention.

What is claimed is:

1. In a transmission, the combination of a drive shaft, a driven shaft, a first planetary gear set and a second planetary gear set, each of said gear sets comprising a sun gear and a ring gear and a planet gear in mesh with the sun and ring gears and a planet gear carrier, a first clutch for connecting said ring gear of said first gear set with said drive shaft, a second clutch for connecting said sun gear of said first gear set with said drive shaft, a third clutch for interconnecting said gear carrier of said first gear set with said gear carrier of said second gear set, a first brake for holding said sun gear of said first gear set, a second brake for holding said gear carrier of said first gear set, a third brake for holding said ring gear of said second gear set, said ring gear of said first gear set and said sun gear of said second gear set being interconnected, said gear carrier of said second gear set being connected to said driven shaft, said first clutch and said third brake being engageable to provide a low speed forward drive from said drive shaft to said driven shaft, said first and third clutches and said first brake being engagable to provide an intermediate speed forward drive, all of said clutches being engageable to provide a direct drive between said drive and said driven shafts, said second clutch and said second and third brakes being engageable to provide a low speed reverse drive between said drive shaft and said driven shaft, said second and third clutches and said third brake being engageable to provide a higher speed reverse drive.

2. In a transmission, the combination of a drive shaft, a driven shaft, a first planetary gear set and a second planetary gear set, each of said gear sets comprising a sun gear and a ring gear and a planet gear in mesh with the sun and ring gears and a planet gear carrier, a first clutch for connecting said ring gear of said first gear set with said drive shaft, a second clutch for connecting said sun gear of said first gear set with said drive shaft, a third clutch for interconnecting said gear carrier of said first gear set with said gear carrier of said second gear set, a brake for holding said gear carrier of said first gear set, a brake for holding said ring gear of said second gear set, said ring gear of said first gear set and said sun gear of said second gear set being interconnected, said gear carrier of said second gear set being connected to said driven shaft, said first clutch and said ring gear brake being engageable to provide a low speed forward drive from said drive shaft to said driven shaft, all of said clutches being engageable to provide direct drive between said drive and said driven shafts, said second clutch and said brakes being engageable to provide a low speed reverse drive between said drive shaft and said driven shaft, said second and third clutches and said ring gear brake being engageable to provide a higher speed reverse drive.

3. In a transmission, the combination of a drive shaft, a driven shaft, a first planetary gear set and a second planetary gear set, each of said gear sets comprising a sun gear and a ring gear and a planet gear in mesh with the sun and ring gears and a planet gear carrier, a first clutch for connecting said ring gear of said first gear set with said drive shaft, a second clutch for connecting said sun gear of said first gear set with said drive shaft, a third clutch for interconnecting said gear carrier of said first gear set with said gear carrier of said second gear set, a brake for holding said sun gear of said first gear set, a brake for holding said ring gear of said second gear set, said ring gear of said first gear set and said sun gear of said second gear set being interconnected, said gear carrier of said second gear set being connected to said driven shaft, said first clutch and said ring gear brake being engageable to provide a low speed forward drive from said drive shaft to said driven shaft, said first and third clutches and said sun gear brake being engageable to provide an intermediate speed forward drive, all of said clutches being engageable to provide a direct drive between said drive shaft and said driven shafts, said second and third clutches and said ring gear brake being engageable to provide a high speed reverse drive.

References Cited in the file of this patent

UNITED STATES PATENTS

| | | |
|---|---|---|
| 2,682,786 | Flinn | July 6, 1954 |
| 2,844,975 | Kelbel et al. | July 29, 1958 |
| 2,932,977 | Ball | Apr. 19, 1960 |